United States Patent [19]
Lundquist

[11] Patent Number: 5,655,482
[45] Date of Patent: Aug. 12, 1997

[54] DOUBLE-SIDED PET COMB

[75] Inventor: Charles Lundquist, 6950 Sherry Pl., Paso Robles, Calif. 93446

[73] Assignee: Charles Lundquist, Paso Robles, Calif.

[21] Appl. No.: 599,546

[22] Filed: Jul. 6, 1995

[51] Int. Cl.[6] .................................................. A01K 13/00
[52] U.S. Cl. ............................................................ 119/625
[58] Field of Search ..................................... 119/625, 628, 119/630, 631, 632, 633; 132/219; D30/158, 159; D28/21, 22, 23, 24, 25, 28, 29, 30, 31, 34

[56] References Cited

U.S. PATENT DOCUMENTS

| | | | |
|---|---|---|---|
| 145,891 | 12/1873 | Morton | 119/631 |
| 162,455 | 4/1875 | Barringer | 119/633 |
| 272,558 | 2/1883 | Lawrence | 119/633 |
| 476,189 | 5/1892 | Decker | 119/633 X |
| 553,300 | 1/1896 | Carden | 119/631 X |
| 2,151,056 | 3/1939 | Stone | 119/632 |

*Primary Examiner*—Gene Mancene
*Assistant Examiner*—Thomas Price
*Attorney, Agent, or Firm*—D'Alessandro & Ritchie

[57] ABSTRACT

A double-sided comb according to the present invention comprises a handle to which a T-bar frame is mounted on one end of the handle in an orientation perpendicular to the handle. A plurality of generally cone-shaped first teeth extend outward from and perpendicular to a first edge of the T-bar frame. A plurality of generally cone-shaped second teeth extend outward from and perpendicular to a second edge of the T-bar frame opposite the first edge so that the first teeth and the second teeth are substantially 180° degrees opposed from one another and are perpendicular to the handle.

9 Claims, 3 Drawing Sheets

DOUBLE-SIDED PET COMB

BACKGROUND OF THE INVENTION

1. Field of the Invention

The present invention relates to human personal care and animal care products. More particularly, the present invention relates to a double-sided comb which may be used for human and animal grooming needs.

2. The Prior Art

U.S. Pat. No. Des. 91,426 discloses a design for a double-sided comb having a first set of teeth longer than a second set of teeth. The first and second sets of teeth extend from opposite sides of a frame which comprises an axial extension of the handle.

U.S. Pat. No. Des. 99,271 discloses a design for a double-sided comb wherein the two sets of teeth are formed in arcuate shapes and extend from a frame which comprises an axial extension of the handle.

U.S. Pat. No. Des. 115,214 discloses a design for a double-ended double-sided comb which has no handle as such. One set of double-sided combs is used as the handle while one set of teeth on the other double-sided comb is used as the comb. One set of teeth in each of the sets of double-sided combs is longer than the other set of teeth.

U.S. Pat. No. Des. 118,810 discloses a design for a double-sided comb having a first set of teeth the same length as but with wider spacing than a second set of teeth. The first and second sets of teeth extend from opposite sides of a frame which comprises an axial extension of the handle.

U.S. Pat. No. Des, 154,784 discloses a design for a combination comb and safety hair cutter. First and second sets of teeth extend from opposite sides of a frame which comprises an axial extension of the handle. The second set of teeth has fewer teeth and provision is made for a razor blade to be mounted below the ends of the teeth in the second set to allow cutting of hair, presumably with a combing motion.

U.S. Pat. No. Des. 289,567 discloses a design for a double-sided comb having first and second sets of teeth which extend from opposite sides of a frame which comprises an axial extension of the handle. The second set of teeth are finer and more closely spaced than the first set of teeth.

U.S. Pat. No. Des. 345,440 discloses a design for a double-sided comb having a first set of teeth much larger than a second set of teeth. The second set of teeth are two different sizes. The handle is integral with the frame supporting the teeth.

BRIEF DESCRIPTION OF THE INVENTION

A double-sided comb according to the present invention comprises a handle to which a T-bar frame is mounted on one end of the handle in an orientation perpendicular to the handle. A plurality of generally cone-shaped first teeth extend outward from and perpendicular to a first edge of the T-bar frame. In a preferred embodiment, the T-bar frame extends about 2 inches in both directions from the handle. A plurality of generally cone-shaped second teeth extend outward from and perpendicular to a second edge of the T-bar frame opposite the first edge so that the first teeth and the second teeth are substantially 180° degrees opposed from one another and are perpendicular to the handle. The first teeth have a length shorter than the length of the second teeth. In a presently preferred embodiment of the invention, the first teeth have a length of about one-half inch and the second teeth have a length of about three-quarters of an inch. Both the first and second teeth have a larger diameter where they are in contact with the T-bar frame are spaced apart about 0.08 to about 0.10 inches from one another.

DETAILED DESCRIPTION OF A PREFERRED EMBODIMENT

Figure 1:
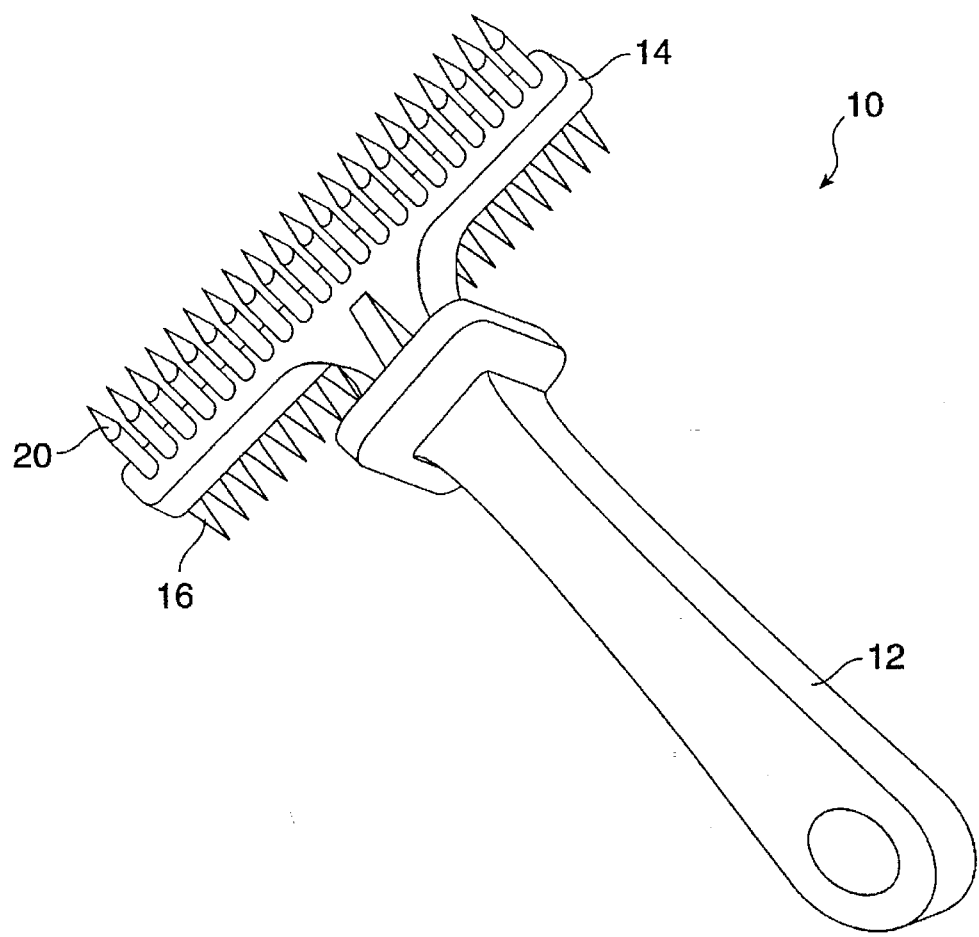
FIG. 1 is a top perspective view of a double sided comb according to the present invention.
Figure 2:
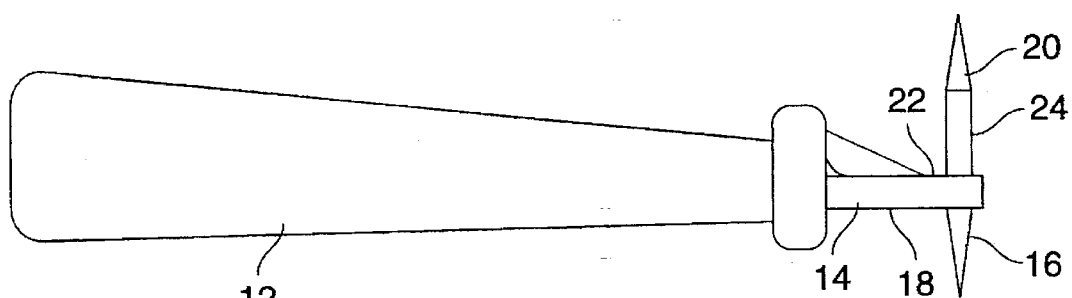
FIG. 2 is an elevational view of both the right and left sides of the double sided comb of FIG. 1.
Figure 3:
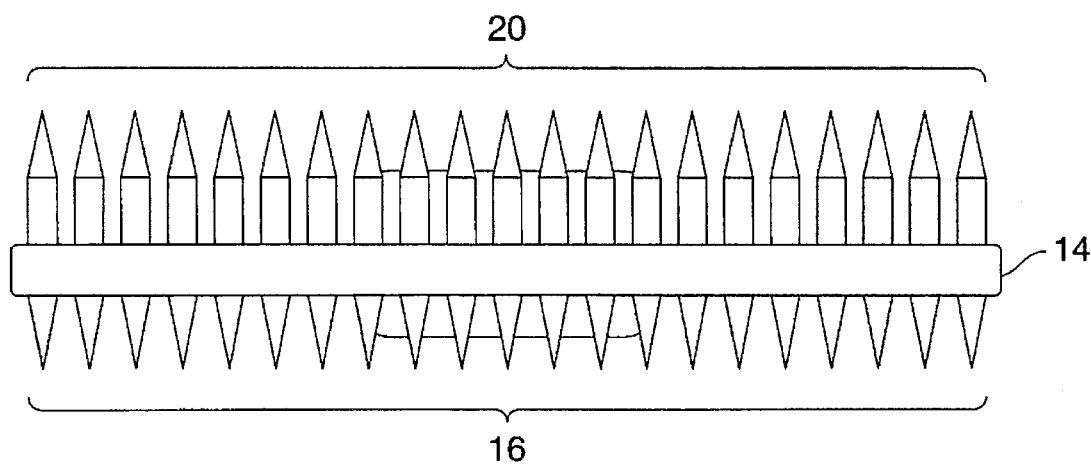
FIG. 3 is a front elevational view of the double sided comb of FIG. 1.
Figure 5:
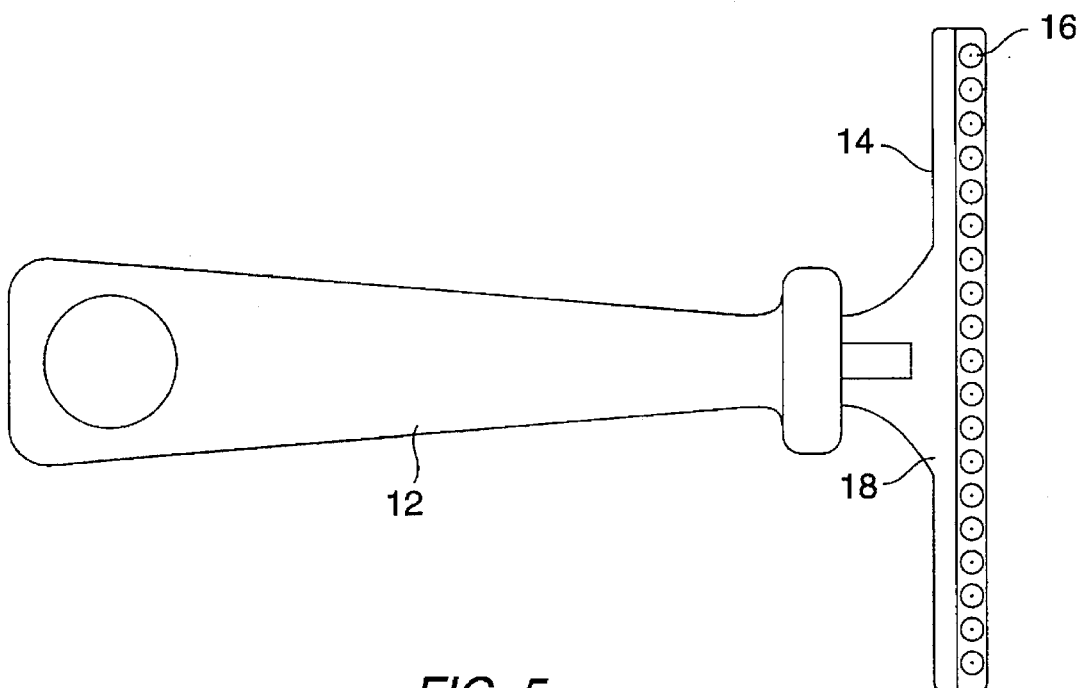
FIG. 5 is a top plan view of the double sided comb of FIG. 1.
Figure 4:
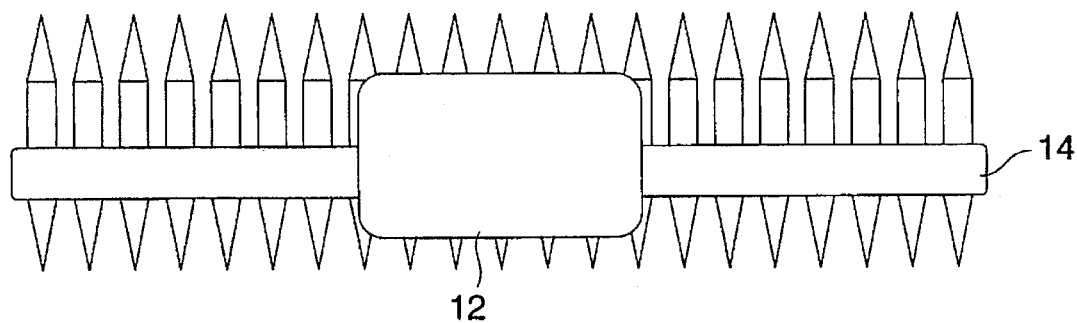
FIG. 4 is a rear elevational view of the double sided comb of FIG. 1.
Figure 6:
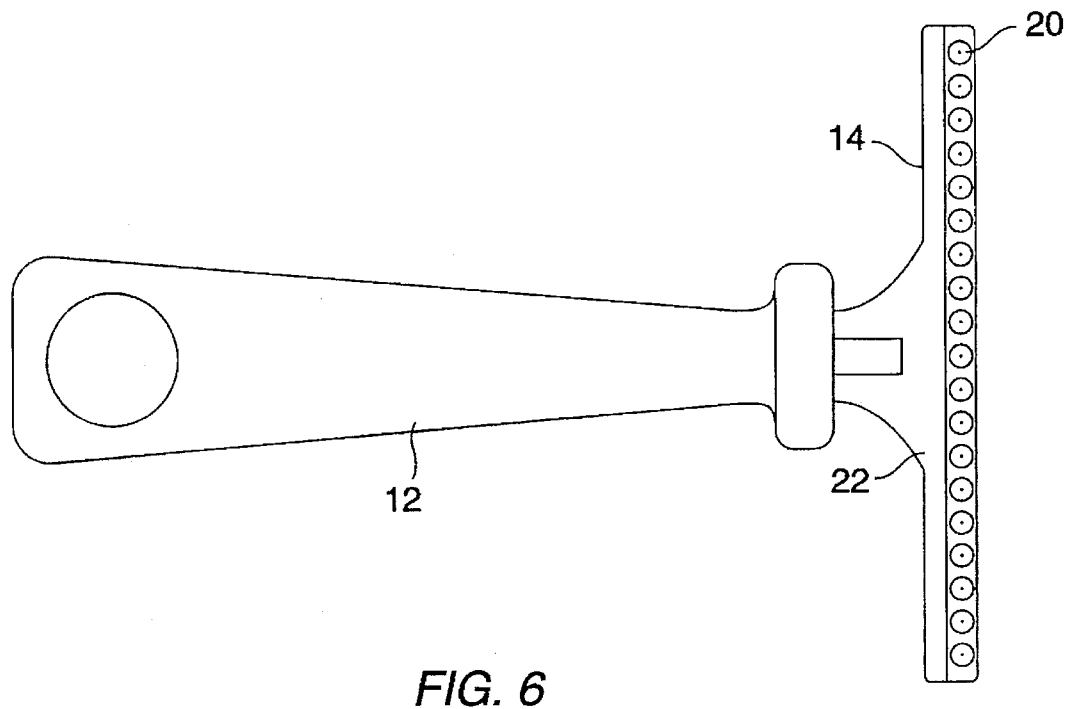
FIG. 6 is a bottom plan view of the double sided comb of FIG. 1.

Those of ordinary skill in the art will realize that the following description of the present invention is illustrative only and not in any way limiting. Other embodiments of the invention will readily suggest themselves to such skilled persons.

Referring to the drawing figures, a double-sided comb 10 according to the present invention comprises a handle 12 to which a T-bar frame 14 is mounted on one end of the handle 12 in an orientation perpendicular to the handle. As presently preferred, handle 12 is sized and is formed in a slightly tapered shape as shown in the drawing figures to facilitate a comfortable grip.

The handle 12 and the frame 14 are oriented to one another as would be their corresponding counterpart elements of a common garden rake. In a preferred embodiment, the T-bar frame 14 is about 4 inches long and extends about 2 inches in both directions from the handle.

A plurality of generally cone-shaped first teeth 16 extend outward from and perpendicular to a first edge 18 of the T-bar frame 14. A plurality of generally cone-shaped second teeth 20 extend outward from and perpendicular to a second edge 22 of the T-bar frame opposite the first edge so that the first teeth and the second teeth are substantially 180° degrees opposed from one another and are perpendicular to the handle 12.

The first teeth 16 are equal in length, as are the second teeth 20, and both the first and second teeth 16 and 20 are preferably circular or oval in cross section. The first teeth 16 are all mounted in a single plane and the second teeth 20 are also mounted in a single plane, and are preferrably in the same plane as the first teeth 16. If they are formed to be oval in cross section, they are oriented on the T-bar frame 14 such that the single axis passes through all of their minor diameters.

The first teeth 16 each have a length shorter than the length of the second teeth 20. In a presently preferred embodiment of the invention, the first teeth 16 have a length of about one-half inch and the second teeth 20 have a length of about three-quarters of an inch. The first teeth 18 and second teeth 20 have larger diameters on their proximate ends where they join the T-bar frame and their distal ends are slightly rounded. The proximate ends of the first and second teeth 16 and 20 are preferably about 0.145" in diameter and their distal ends are about 0.050' in diameter. The first teeth are each preferably linearly tapered along their entire lengths from distal to proximate ends. The second teeth are each preferably linearly tapered from their distal ends to a point about two thirds the distance to their proximate ends, and preferably exhibit cylindrical cross section 24 for the remaining third of their length to their proximate ends. The first teeth 16 and the second teeth 20 are each spaced apart from their adjacent neighbors by a distance of about 0.16 to about 0.20 inches.

The double-sided comb of the present invention is preferably formed from a plastic polymer material such as nylon, acetyl, or the like using an injection molding process.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A double-sided comb comprising:

a handle having a first end and a second end;

a single T-bar frame fixedly mounted on said first end of said handle in an orientation perpendicular to said handle;

a plurality of elongated generally-cone shaped first teeth extending outwardly from and perpendicular to a first edge of said T-bar frame; and a plurality of elongated generally-cone shaped second teeth extending outwardly from and perpendicular to a second edge of said T-bar frame opposite to said first edge such that said first teeth mad said second teeth extend in directions substantially 180° from one another and are perpendicular to said handle.

2. The double sided comb of claim 1 formed from a single piece of plastic polymer material.

3. The double sided comb of claim 1 injection molded from a single piece of nylon material.

4. The double sided comb of claim 1 injection molded from a single piece of acetyl material.

5. The double sided comb of claim 1 wherein said first and second teeth are circular in cross section.

6. The double sided comb of claim 1 wherein said first and second teeth are oval in cross section and are oriented such that a single axis passes through the minor diameters of said oval cross section of each of said first and second teeth.

7. The double sided comb of claim 1 wherein said first teeth each have a length shorter than that said second teeth.

8. The double sided comb of claim 1 wherein the distal ends of said first and second teeth are rounded.

9. The double sided comb of claim 1 wherein the distal ends of said first and second teeth have a diameter of about 0.050 inches and the ends of said first and second teeth joining said T-bar frame are about 0.145 inches in diameter.

* * * * *

UNITED STATES PATENT AND TRADEMARK OFFICE
CERTIFICATE OF CORRECTION

PATENT NO. : 5,655,482
DATED : August 12, 1997
INVENTOR(S) : Charles Lundquist

It is certified that error appears in the above-indentified patent and that said Letters Patent is hereby corrected as shown below:

Column 3, line 1: replace "0.050'" with --0.050"--.
Column 4, line 4: replace "mad" with --and--.

Signed and Sealed this

Twenty-seventh Day of January, 1998

Attest:

BRUCE LEHMAN

Attesting Officer

Commissioner of Patents and Trademarks